US009121562B2

(12) United States Patent
Okubo

(10) Patent No.: US 9,121,562 B2
(45) Date of Patent: Sep. 1, 2015

(54) VEHICLE HEADLAMP

(75) Inventor: Yasuhiro Okubo, Isehara (JP)

(73) Assignee: ICHIKOH INDUSTRIES, LTD., Kanagawa-ken (JP)

( * ) Notice: Subject to any disclaimer, the term of this patent is extended or adjusted under 35 U.S.C. 154(b) by 0 days.

(21) Appl. No.: 13/553,232

(22) Filed: Jul. 19, 2012

(65) Prior Publication Data

US 2013/0027958 A1 Jan. 31, 2013

(30) Foreign Application Priority Data

Jul. 26, 2011 (JP) ................................. 2011-163675

(51) Int. Cl.
*B60Q 1/32* (2006.01)
*F21S 8/10* (2006.01)

(52) U.S. Cl.
CPC ......... *F21S 48/1364* (2013.01); *F21S 48/1159* (2013.01); *F21S 48/1352* (2013.01); *F21S 48/1784* (2013.01)

(58) Field of Classification Search
USPC .................................................. 362/512, 519
See application file for complete search history.

(56) References Cited

U.S. PATENT DOCUMENTS

| | | | |
|---|---|---|---|
| 2010/0165654 A1 | 7/2010 | Okubo et al. | |
| 2010/0194276 A1* | 8/2010 | Okubo et al. | 315/82 |
| 2012/0014125 A1* | 1/2012 | Uchida | 362/538 |

FOREIGN PATENT DOCUMENTS

| | | | |
|---|---|---|---|
| DE | 20 2010 003 058 U1 | 6/2010 |
| EP | 1 970 617 B1 | 9/2008 |
| EP | 2 028 411 B1 | 2/2009 |
| EP | 2 143 994 A1 | 1/2010 |
| EP | 2 282 110 A2 | 2/2011 |
| EP | 2 405 191 A1 | 1/2012 |
| JP | 2000-200510 A | 7/2000 |
| JP | 2007-194166 A | 8/2007 |
| JP | 2010-018178 A | 1/2010 |

OTHER PUBLICATIONS

Y. Okubo, U.S. PTO Notice of Allowance, U.S. Appl. No. 13/553,207, dated Jun. 16, 2014, 8 pages.

* cited by examiner

*Primary Examiner* — Mariceli Santiago
*Assistant Examiner* — Brenitra M Lee
(74) *Attorney, Agent, or Firm* — Foley & Lardner LLP

(57) ABSTRACT

The present invention is provided with a semiconductor-type light source 2, a reflector 3, a shade 4, and a driving mechanism 5. The reflector 3 has a first reflection surface 9 and a second reflection surface 10. The first reflection surface 9 is a reflection surface adapted to reflect and emit incident light from among rays of light from the semiconductor-type light source 2 as a light distribution pattern for low beam LP. The second reflection surface 10 is a reflection surface adapted to reflect and emit incident light from among rays of light from the semiconductor-type light source 2 as a light distribution pattern for high beam HP. As a result, the present invention can provide a vehicle headlamp that employs the semiconductor-type light source 2 to thereby switch and emit the light distribution pattern for low beam and the light distribution pattern for high beam HP.

6 Claims, 6 Drawing Sheets

VEHICLE HEADLAMP

CROSS-REFERENCE TO RELATED APPLICATIONS

This application claims priority of Japanese Patent Application No. 2011-163675 filed on Jul. 26, 2011. The contents of this application are incorporated herein by reference in their entirety.

BACKGROUND OF THE INVENTION

1. Field of the Invention

The present invention relates to a vehicle headlamp employing a semiconductor-type light source as a light source to switch and emit a light distribution pattern for low beam (for passing) and a light distribution pattern for high beam (for cruising).

2. Description of the Related Art

A vehicle headlamp employing a semiconductor-type light source as a light source is conventionally known (for example, Japanese Unexamined Patent Application Publication No. 2010-18178). Hereinafter, a conventional vehicle headlamp will be described. The conventional vehicle headlamp is provided for switching and emitting a light distribution pattern for DTL and a light distribution pattern for cruising by means of a switch of a scattering lens.

In addition, a vehicle headlamp adapted to switch and emit a light distribution pattern for low beam and a light distribution pattern for high beam is also conventionally known (for example, Japanese Unexamined Patent Application Publication No. 2000-200510). Hereinafter, a conventional vehicle headlamp will be described. The conventional vehicle headlamp is provided in such a manner that: a shade is positioned in a low beam location; light from a discharge lamp is reflected on a first reflection surface to thereby obtain a light distribution pattern for low beam; the shade is switched and positioned in a high beam location; and the light from the discharge lamp is reflected on the first reflection surface and a second reflection surface to thereby obtain a light distribution pattern for high beam.

However, the former one of the conventional vehicle headlamps has entailed a problem that a light distribution pattern for passing and a light distribution pattern for cruising cannot be switched and emitted. In addition, the latter one of the conventional vehicle headlamps has entailed a problem that a discharge lamp is used as a light source, whereas a semiconductor-type light source is not used as a light source.

SUMMARY OF THE INVENTION

The present invention has been made in order to solve the problems described above, and it is an object of the present invention to provide a vehicle headlamp employing a semiconductor-type light source as a light source to thereby switch and emit a light distribution pattern for low beam and a light distribution patter for high beam. In other words, it is an object of the present invention to provide a vehicle headlamp for switching and emitting a light distribution pattern for low beam and a light distribution pattern for high beam by means of one lamp unit employing a semiconductor-type light source as a light source (by means of one semiconductor-type light source).

A vehicle headlamp according to a first aspect of the present invention comprising:

a semiconductor-type light source;

a reflector having a first reflection surface and a second reflection surface;

a shade that is disposed to be movable between a first location and a second location, and that is adapted to shade a fraction of light from the semiconductor-type light source and to cause remaining light to be incident to the first reflection surface, when the shade is positioned in the first location, and cause the light from the semiconductor-type light source to be incident to the first reflection surface and the second reflection surface, when the shade is positioned in the second location; and a driving mechanism adapted to move and switch the shade between the first location and the second location, wherein the first reflection surface is a reflection surface that is provided in proximity to the semiconductor-type light source, the reflection surface being adapted to reflect and emit incident light from among rays of the light from the semiconductor-type light source as a light distribution pattern for low beam, and the second reflection surface is a reflection surface that is provided outside of the first reflection surface so as to be spaced from the semiconductor-type light source, the reflection surface being adapted to reflect and emit incident light from among rays of the light from the semiconductor-type light source as a light distribution pattern for high beam.

The vehicle headlamp according to a second aspect of the present invention, wherein a third reflection surface is provided between the first reflection surface and the second reflection, and the third reflection surface is a reflection surface adapted to reflect and emit incident light from among rays of the light from the semiconductor-type light source as an auxiliary light distribution pattern.

A vehicle headlamp according to a first aspect of the present invention is provided in such a manner that: if a shade is positioned in a first location, a fraction of light from a semiconductor-type light source is shaded by means of the shade; the remaining light from the semiconductor-type light source, which is not shaded by means of the shade, is incident to a first reflection surface; and the incident light is emitted after reflected as a light distribution pattern for high beam. In this manner, the vehicle headlamp according to the first aspect of the present invention is capable of employing a semiconductor-type light source as a light source to thereby switch and emit a light distribution pattern for low beam and a light distribution pattern for high beam. In other words, this vehicle headlamp is capable of switching and emitting a light distribution pattern for low beam and a light distribution pattern for high beam by means of one lamp unit employing a semiconductor light source as a light source (by means of one semiconductor-type light source).

A vehicle headlamp according to a second aspect of the preset invention is provided in such a manner that a third reflection surface is provided between a first reflection surface and a second reflection surface. Thus, in a case where an allowable tolerance is set in precision of a stop position of a shade, when the shaped is positioned in a first location, even if light from a semiconductor-type light source leaks from a first reflection surface side to a second reflection surface side, such light leakage can be effectively utilized as an auxiliary light distribution pattern by means of the third reflection surface for buffering (for light buffering) that is provided between the first reflection surface and the second reflection surface. In other words, in the vehicle headlamp according to the second aspect of the present invention, when the shade is positioned in the first location, light from the semiconductor-type light source, the light having leaked due to displacement of the shade, is incident to the second reflection surface as it is, it becomes possible to reliably prevent the incident light from being troublesome light at the time of emission of a light distribution pattern of low beam.

DESCRIPTION OF THE PREFERRED EMBODIMENTS

Figure 1:
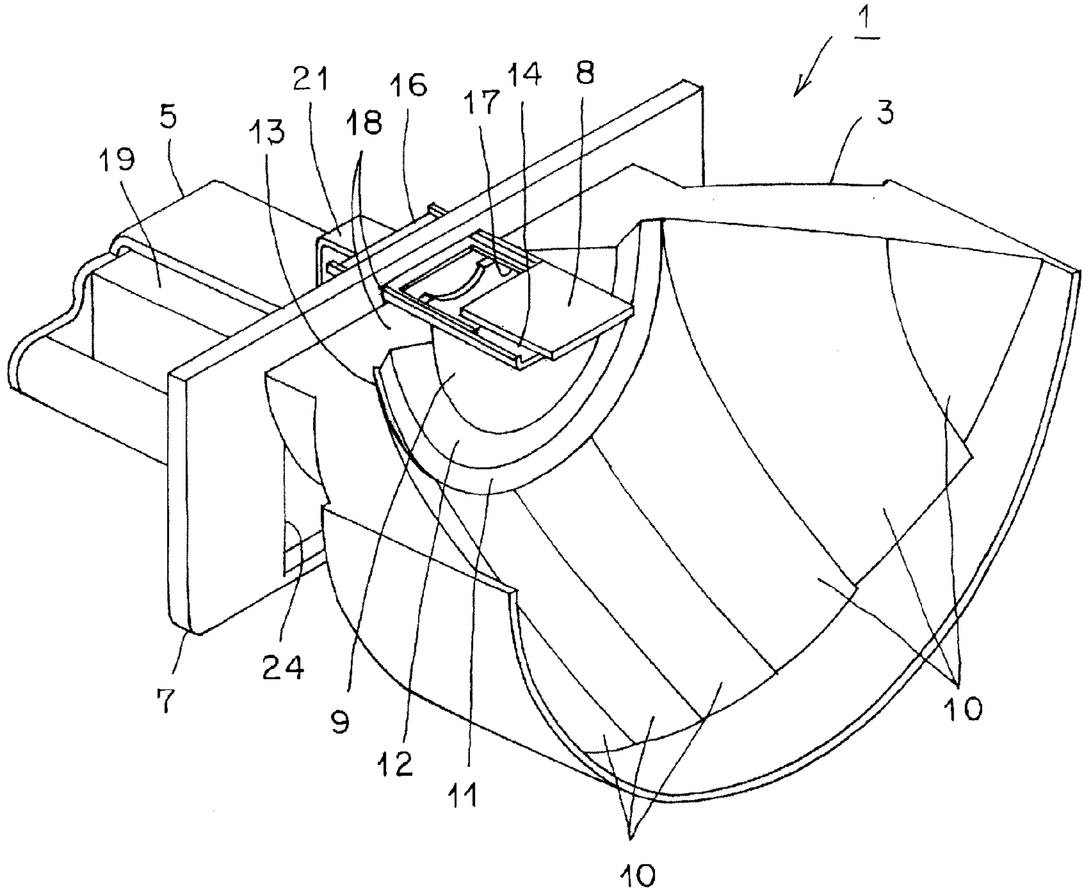
FIG. 1 shows en embodiment of a vehicle headlamp according to the present invention, and is a perspective view showing a lamp unit in a state in which a heat sink member is removed.

Hereinafter, one of the embodiments (exemplary embodiments) of a vehicle headlamp according to the present invention will be described in detail with reference to the drawings. It is to be noted that the present invention is not limited by the embodiments. In the present specification, the front, back, upside, downside, left, and light respectively correspond to the front, back, upside, downside, left and right in a case in which the vehicle headlamp according to the present invention is equipped in a vehicle. In addition, a combination of uppercase letters with hyphen "VU-VD" designates a vertical line from top to bottom of a screen. A combination of uppercase letters with hyphen "HL-HR" designates a horizontal line from left to right of the screen.

(Description of Configuration of the Embodiment)

Hereinafter, a configuration of a vehicle headlamp in the embodiment will be described. In the figures, reference numeral 1 designates a vehicle headlamp (such as a headlamp, for example) in the exemplary embodiment. The vehicle headlamp 1 is mounted on each of the left and right end parts of a front portion of a vehicle.

The vehicle headlamp 1 is provided with a lamp housing (not shown), a lamp lens (not shown), a semiconductor-type light source 2, a reflector 3, a shade 4, a driving mechanism 5, a heat sink member 6, and a mount bracket 7.

The semiconductor-type light source 2, the reflector 3, the shade 4, the driving mechanism 5, the heat sink member 6, and the mount bracket 7 configure a lamp unit. The lamp housing and the lamp lens define a lamp room (not shown). The lamp unit is disposed in the lamp room, and is mounted on the lamp housing via an optical axis adjustment mechanism for vertical direction (not shown) and an optical axis adjustment mechanism for horizontal direction (not shown).

The semiconductor-type light source 2, in this example, uses a light source of one's own light emitting semiconductor-type such as an LED or an EL (an organic EL) or the like, for example, in other words, a semiconductor-type light source (an LED in this exemplary embodiment). The semiconductor-type light source 2 has a light emitting portion in which one or a plurality of light emitting chips (not shown) is provided. The semiconductor-type light source 2 is made of: a board (not shown); the light emitting chips that are appropriately disposed and provided on the board; and a sealing resin member (not shown) adapted to seal the light emitting chips. The semiconductor light source 2 is mounted on the heat sink 6 by means of a mount member 8. A light emitting surface of the light emitting portion of the semiconductor light source 2 is oriented to the downside in a vertical direction.

The reflector 3 is made of a light non-transmissible member, in this example, a resin member. The reflector 3 is mounted on at least one of the head sink member 6 and the mount bracket 7. The reflector 3 opens at a portion of the upside U and the front side F, and closes at other portions.

A first reflection surface 9, a second reflection surface 10, and a third reflection surface 11 that are made of a parabola-based free curved surface (NURBS-curved surface) are respectively provided on an interior face of the closed portion of the reflector 3. The first reflection surface 9, the second reflection surface 10, and the third reflection surface 11 are respectively provided at an opposite side to the light emitting surface, in other words, in a space of the downside of the semiconductor-type light source 2.

The first reflection surface 9 is provided in proximity to the semiconductor-type light source 2. The first reflection surface 9 is a reflection surface adapted to reflect and emit incident light of rays of the light from the semiconductor-type light source 2 as a light distribution pattern for low beam LP (refer to FIG. 6 and FIG. 7).

The second reflection surface 10 is provided outside of the first reflection surface 9 in such a manner as to be spaced from the semiconductor-type light source 2. The second reflection surface 10 is a reflection surface adapted to reflect and emit the incident light from among beams of the light from the semiconductor-type light source 2 as the light distribution pattern for high beam HP (refer to FIG. 8).

The third reflection surface 11 is provided between the first reflection surface 9 and the second reflection surface 10. The third reflection surface 11 is a reflection surface adapted to reflect and emit the incident light from among beams of the light from the semiconductor-type light source 2 as an auxiliary light distribution pattern, in this example, as a light distribution pattern for overhead sign OSP (refer to FIG. 6) or a light distribution pattern for front side BP (refer to FIG. 7).

Figure 6:
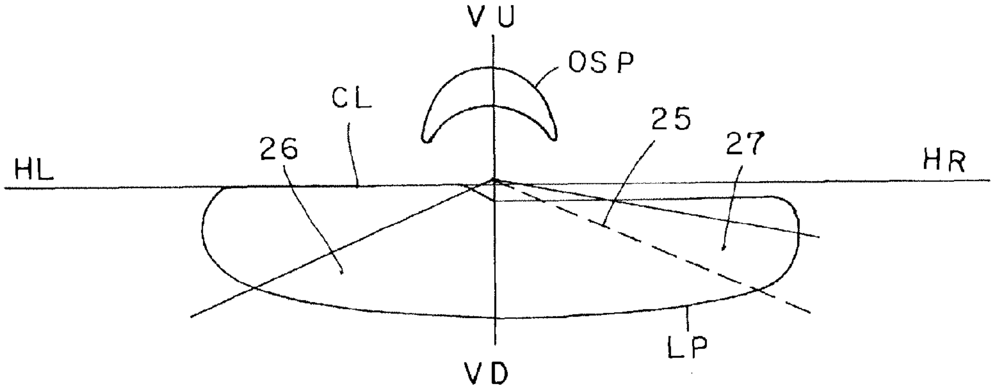
FIG. 6 is an explanatory view showing a light distribution pattern for low beam and a light distribution pattern for overhead sign.
Figure 7:
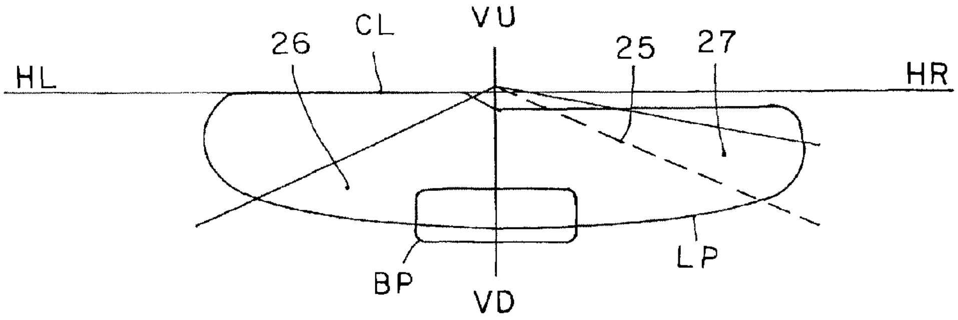
FIG. 7 is an explanatory view showing a light distribution pattern for low beam and a light distribution pattern for front side.

The light distribution pattern for overhead sign OSP, as shown in FIG. 6, is adapted to illuminate an overhead sign (not shown) on the upside more than a cutoff line CL of the light distribution pattern for low beam LP, in other words, overhead of the vehicle. In addition, the light distribution pattern for front side BP, as shown in FIG. 7, is adapted to illuminate a portion of the downside of the light distribution pattern for low beam LP, in other words, the front side of a road surface. The light distribution pattern for overhead sign OSP and the light distribution pattern for front side BP are not those which disturb light distribution characteristics of the light distribution pattern for low beam LP.

Figure 2:
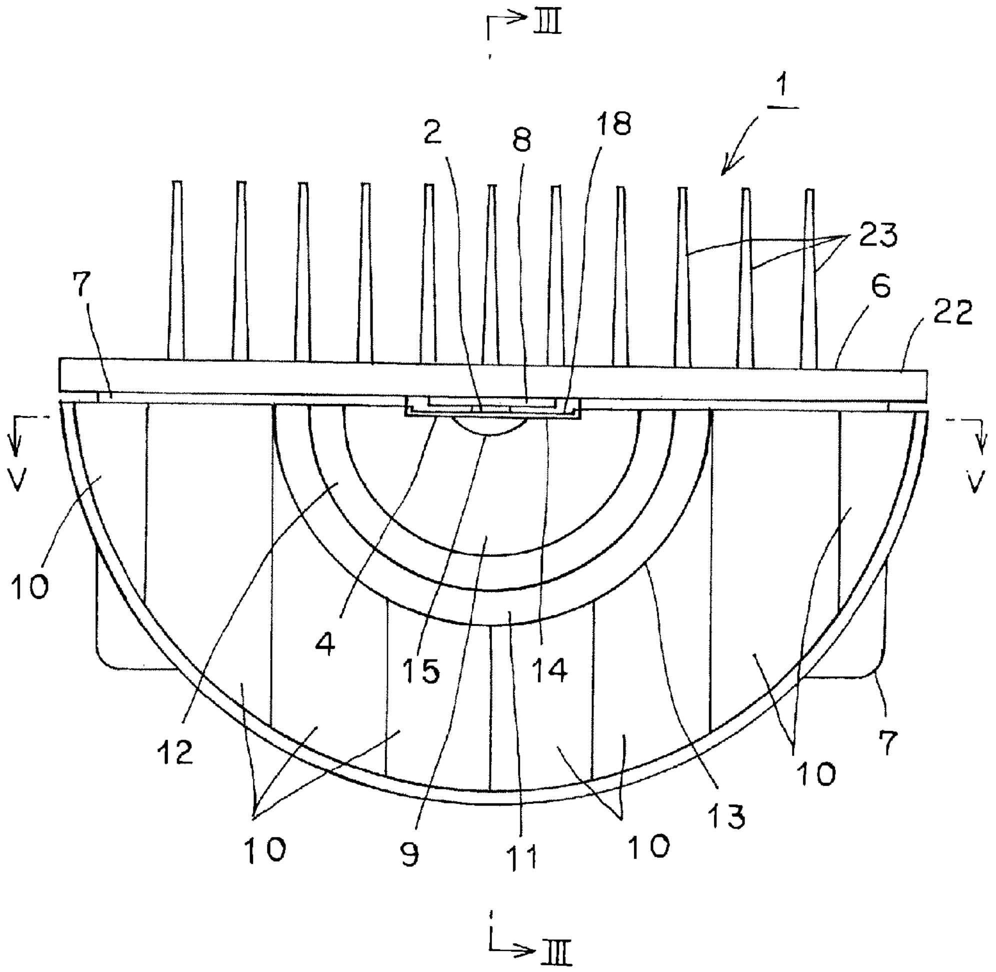
FIG. 2 is a front view showing a lamp unit.

As shown in FIG. 2, the second reflection surface 10, in this example, is made of eight segments at the left and right. The first reflection surface 9 and the third reflection surface 11, in this example, are made of one segment. Step heights 12 and 13 are respectively provided between the first reflection surface 9 and the third reflection surface 11 and between the third reflection surface 11 and the second reflection surface 10.

The shade 4 is made of: a slide guide portion 14 that is formed in a recessed shape with a shallow bottom thereof; a shade portion 15 that is formed in a ¼ spherical shape that is integrally provided at one end part (a front side end part) of the slide guide portion 14; and a fixing portion 16 that is integrally provided at the other end part (a back side end part) of the slide guide portion 14. An opening portion 17 is provided at an intermediate part of the slide guide portion 14.

A fixing guide portion 18 is provided on one surface (an upper surface) of the reflector 3 and on the mount bracket 7. On the fixing guide portion 18 of the reflector 3 and the mount bracket 7, the slide guide portion 14 of the shade 4 is mounted movably (slidably) in one direction (in a forward/backward direction). As a result, the shade 4 is disposed movably between a first location (a back side location shown in FIG. 3) and a second location (a front side position shown in FIG. 4). The first location, as shown in FIG. 3, is a location in which the third reflection surface 11 is disposed on a straight line that connects the semiconductor-type light source 2 and an edge (an opening edge) of the shade portion 15 of the shade 4 to each other.

Figure 3:
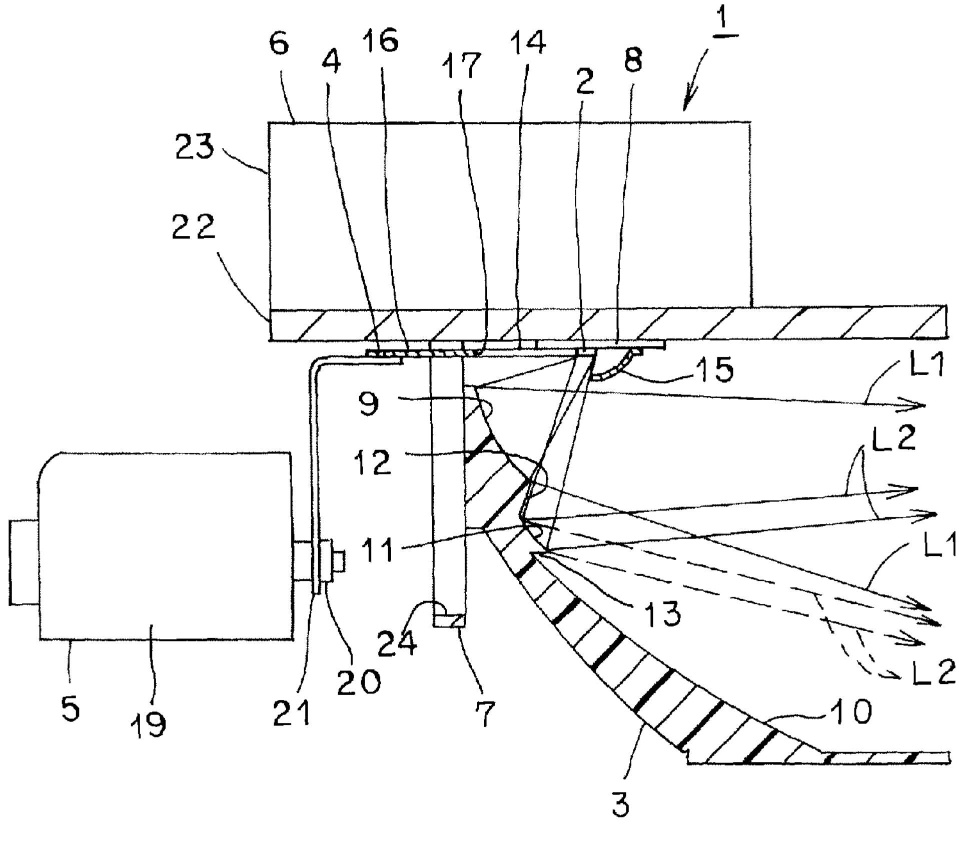
FIG. 3 is a sectional view taken along the line in FIG. 2, showing a state in which a shade is positioned in a first location.
Figure 4:
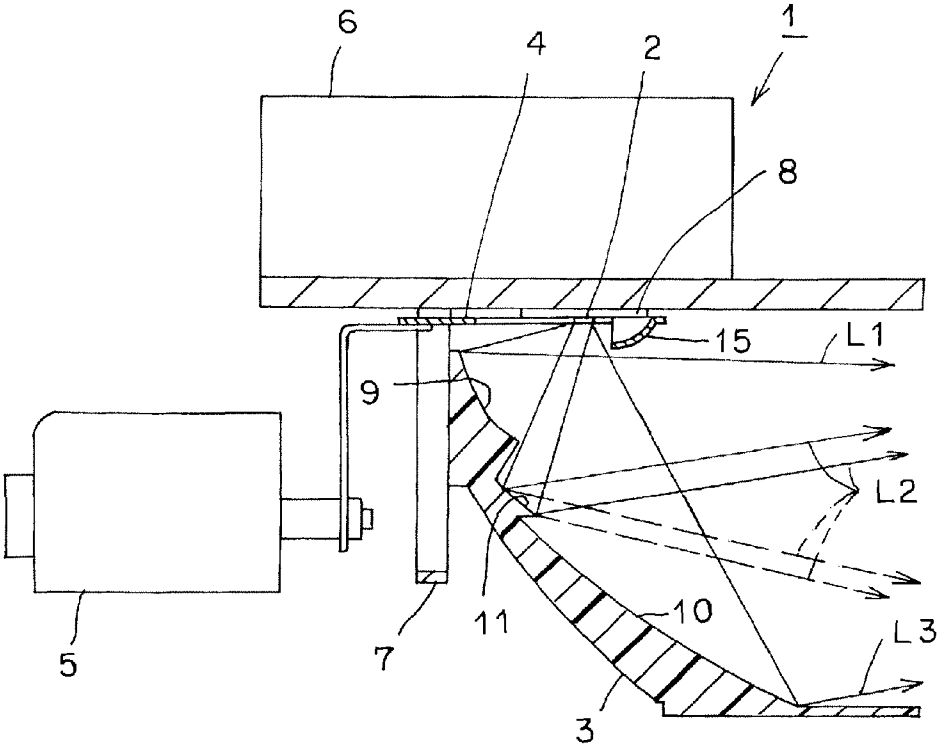
FIG. 4 is a sectional view taken along the line in FIG. 2, showing a state in which a shade is positioned in a second location.
Figure 5:
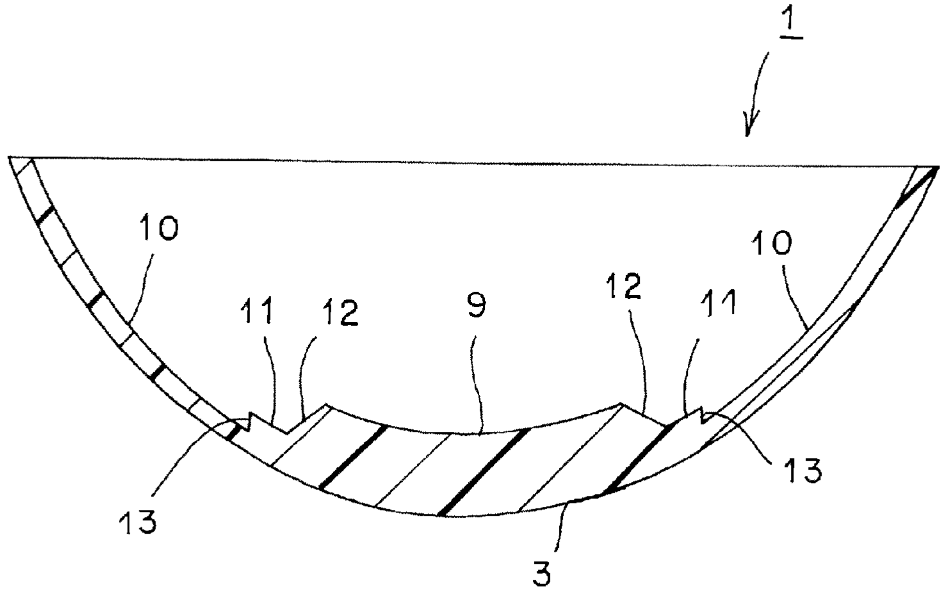
FIG. 5 is a sectional view taken along the line V-V in FIG. 2, showing a first reflection surface, a second reflection surface, and a third reflection surface of a reflector.

When the shade 4 is positioned in the first location, as shown in FIG. 3, a fraction of the light from the semiconductor-type light source 2 is shaded by means of the shade portion 15 of the shade 4 and then the remaining light is caused to be incident to the first reflection surface 9 and the third reflection surface 11. Alternatively, when the shade 4 is positioned in the second location, as shown in FIG. 4, the light from the semiconductor-type light source 2 is caused to be incident to the first reflection surface 9 and the third reflection surface 11 and then is further caused to be incident to the second reflection surface 10.

The driving mechanism 5 is a solenoid in this example. The driving mechanism 5 is adapted to move and switch the shade 4 between the first location and the second location. The driving mechanism 5 is made of: a solenoid main body potion 19; and a plunger (an advancing and retracting rod) 20 that is provided retractably from the solenoid main body portion 19. The solenoid main body portion 19 of the driving mechanism 5 is mounted on at least one of the heat sink member 6 and the mount bracket 7. The plunger 20 of the driving mechanism 5 is mounted on the fixing portion 16 of the shade 4 via an L-shaped connecting member 21.

When the driving mechanism 5 is established in a normal state, in other words, in a state in which no power is supplied to the solenoid main body portion 19, as shown in FIG. 3, this driving mechanism 5 causes the shade 4 to be positioned in the first location by means of a spring, although not shown (a spring that is incorporated in the driving mechanism 5 or a spring that is provided separately). When power is supplied to the solenoid main body portion 19, as shown in FIG. 4, the plunger 20 advances against a spring force of the spring and then causes the shade 4 to move and switch from the first location to the second location. When power supply to the solenoid main body portion 19 is shaded, the plunger 20 is retracted by means of the spring force of the spring and then the shade 4 is caused to move and switch from the second location to the first location.

The heat sink member 6 is made of: a horizontal plate portion 22; and a fin portion 23 that is integrally provided on one surface (an upper surface) of the horizontal plate portion 22. On the other surface (a lower surface) of the horizontal plate portion 22 of the heat sink member 6, the semiconductor-type light source 2 is mounted via the mount member 8.

The mount bracket 7 is formed in the shape of a plate. A window portion 24 is provided at a center part of the mount bracket 7. The fixing guide portion 18 is provided at a center of one edge (an upper edge) of the window portion 24 of the mount bracket 7. One edge (the upper edge) of the mount bracket 7 is mounted on the other surface (the lower surface) of the horizontal plate portion 22 of the heat sink member 7. It is to be noted that the heat sink member 6 and the mount bracket 7 may be integrally structured.

Figure 8:
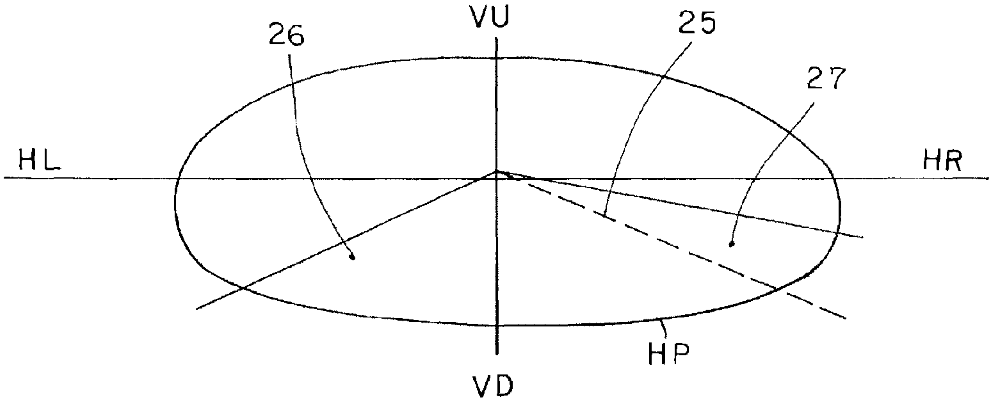
FIG. 8 is an explanatory view showing a light distribution pattern for high beam.

In FIG. 6 to FIG. 8, reference numeral 25 designates a centerline of a road surface; reference numeral 26 designates a cruising lane of a driver's vehicle on a road surface; reference numeral 27 designates an opposite lane.

(Description of Functions of the Embodiment)

The vehicle headlamp 1 in the embodiment is made of the constituent elements as described above, and hereinafter, its related functions will be described.

First, a description will be given with respect to the functions at the time of emission of a light distribution pattern for low beam. At this time, a solenoid main body portion 19 is established in a state in which no power is supplied. Thus, a shade 4 is positioned in a first location. At this time, a semiconductor-type light source 2 is lit. Then, as shown in FIG. 3, a fraction of the light that is radiated from the semiconductor-type light source 2 is shaded by means of a shade portion 15 of the shaped 4 that is positioned in the first location. The remaining light that is not shaded is reflected on a first reflection surface 9 and a third reflection surface 11.

Having thus been reflected on the first reflection surface 9, the reflected light L1 is emitted forward of a vehicle as a light distribution pattern for low beam LP having a cutoff line CL (refer to FIG. 6 and FIG. 7). Having been reflected on the third reflection surface 11, the reflected light L2, as indicated by the arrow drawn by the solid line in FIG. 3, is illuminated forward of the vehicle as a light distribution pattern for overhead sign OSP of an auxiliary light distribution pattern (refer to FIG. 6). Alternatively, having thus been reflected on the third reflection surface 11, the reflected light L2, as indicated by the arrow drawn by the dashed line in FIG. 3, is emitted forward of the vehicle as a light distribution pattern for front side BP (refer to FIG. 7).

In this manner, a road surface in the forward direction (front side) of the vehicle, in other words, a cruising lane 26 and an opposite lane 27 are illuminated as a light distribution pattern for low beam LP. In addition, an overhead sign (not shown) on the forward overhead of the vehicle is illuminated as a light distribution pattern for overhead OSP of an auxiliary light distribution pattern (refer to FIG. 6), or alternatively, a road surface in the forward direction of the vehicle, in other words, a road surface on the front side is illuminated as a light distribution pattern for front side BP (refer to FIG. 7). It is to be noted that in FIG. 6, another light distribution pattern for overhead sign (not shown) may also be distributed as light between a cutoff line CL of a light distribution pattern for low beam LP and a light distribution pattern for overhead sign OSP of an auxiliary light distribution pattern.

Next, a description will be given with respect to the functions at the time of emission of a light distribution pattern for high beam HP. At this time, in a state in which a semiconductor-type light source 2 is lit, power is supplied to the solenoid main body portion 19. The shade 4 that is positioned in the first location is then moved and switched to a second location; and therefore, the light having been shaded by means of the shade portion 15 of the shade 4 up to now is incident to, and is reflected on, the second reflection surface 10.

Having thus been reflected on the second reflection surface 10, the reflected light L3, as shown in FIG. 8, is emitted forward of the vehicle as a light distribution pattern for high beam HP. At this time, the light from the semiconductor-type light source 2 is incident to, and is reflected on, the first reflection surface 9 and the third reflection surface 11 as well. Thus, a light distribution pattern for low beam LP that is obtained by means of the reflected light L1 (refer to FIG. 4) is emitted to a lower halve of the light distribution pattern for high beam HP. On the other hand, a light distribution pattern for overhead sign OSP that is obtained by means of the reflected light L2 (refer to the arrow drawn by the solid line in FIG. 4) or a light distribution pattern for front side BP that is obtained by means of the reflected light L2 (refer to the arrow drawn by the dashed line in FIG. 4) is emitted to an upside or a downside of the light distribution pattern for high beam HP. Here, the light distribution pattern for low beam LP, the light distribution patter for overhead sign OSP, or the light distribution pattern for front side BP are encompassed in the light distribution pattern for high beam HP; and therefore, these light distribution patterns are not shown in FIG. 8. It is to be noted that part or all of the light distribution pattern for overhead sign OSP may be optically distributed at a slightly more upside (upper side) than that of the light distribution pattern for high beam HP.

(Description of Advantageous Effects of the Embodiment)

The vehicle headlamp 1 in the embodiment is made of the constituent elements and functions as described above, and hereinafter, its related advantageous effects will be described.

According to the vehicle headlamp 1 in the embodiment, if the shade 4 is positioned in the first location, a fraction of the light from the semiconductor-type light source 2 is shaded by means of the shade 4, the remaining light from the semiconductor-type light source 2, which is not shaded by means of the shade 4, is incident to the first reflection surface 9, and the incident light is reflected and emitted as a light distribution pattern for low beam LP. In addition, according to the vehicle headlamp 1 in the embodiment, if the shade 4 is moved to, switched to, and positioned in the second location, the light from the semiconductor-type light source 2 is incident to the first reflection surface 9 and the second reflection surface 10 and then the incident light is reflected and emitted as a light distribution pattern for high beam HP. In this manner, the vehicle headlamp 1 in the embodiment employs the semiconductor-type light source 2 as a light source, thereby making it possible to switch and emit the light distribution pattern for low beam LP and the light distribution pattern for high beam HP. In other words, this vehicle headlamp is capable of switching and emitting the light distribution pattern for low beam LP and the light distribution pattern for high beam by means of one lamp unit that employs the semiconductor-type light source 2 as a light source (by means of one semiconductor-type light source 2).

According to the vehicle headlamp 1 in the embodiment, the third reflection surface 11 is provided between the first reflection surface 9 and the second reflection surface 10. Thus, in a case where an allowable tolerance is set in precision of a stop position of the shade 4, when the shade 4 is positioned in the first location, even if the light from the semiconductor-type light source 2 leaks from the side of the first reflection surface 9 to the side of the second reflection surface 10, such light leakage can be effectively utilized as an auxiliary light distribution pattern by means of the third reflection surface 11 for buffering (for light buffering) that is provided between the first reflection surface 9 and the second reflection surface 10. In other words, according to the vehicle headlamp 1 in the embodiment, when the shade 4 is positioned in the first location, the light from the semiconductor-type light source 2, the light having leaked due to displacement of the shade 4, is incident to the second reflection surface 10 as it is, and it becomes possible to reliably prevent the incident light from being troublesome light at the time of emission of the light distribution pattern for low beam LP.

(Description of Examples Other Than the Embodiment)

In addition, in the embodiments, a solenoid is used as a driving mechanism 5. In the present invention, however, as the driving mechanism 5, there may be used a driving mechanism other than the solenoid, for example, a driving mechanism such as a motor.

What is claimed is:

1. A vehicle headlamp comprising:

a semiconductor-type light source;

a reflector having a first reflection surface and a second reflection surface;

a shade that is disposed to be movable between a first location and a second location, and that is configured to shade a fraction of light from the semiconductor-type light source such that no light from the semiconductor-type light source is incident on the second reflective surface, and to cause remaining light to be incident to the first reflection surface, when the shade is positioned in the first location, and cause the light from the semiconductor-type light source to be incident to the first reflection surface and the second reflection surface, when the shade is positioned in the second location; and a driving mechanism configured to move and switch the shade between the first location and the second location, wherein the first reflection surface is a reflection surface that is provided in proximity to the semiconductor-type light source, the reflection surface being adapted to reflect and emit incident light from among rays of the light from the semiconductor-type light source as a light distribution pattern for low beam, and the second reflection surface is a reflection surface that is provided outside of the first reflection surface so as to be spaced from the semiconductor-type light source, the second reflection surface being configured to reflect and emit incident light from among rays of the light from the semiconductor-type light source as a light distribution pattern for high beam.

2. The vehicle headlamp according to claim 1, wherein a third reflection surface is provided between the first reflection surface and the second reflection, and the third reflection surface is a reflection surface adapted to reflect and emit incident light from among rays of the light from the semiconductor-type light source as an auxiliary light distribution pattern.

3. The vehicle headlamp according to claim 2, wherein the shade comprises a shade portion, wherein when the shade is disposed at the first location, the shade portion shades the fraction of the light from the semiconductor-type light source, and the third reflection surface is disposed on a straight line that connects the semiconductor-type light source and an edge of the shade portion.

4. The vehicle headlamp according to claim 1, wherein the shade comprises a shade portion, wherein when the shade is disposed at the first location, the shade portion shades the fraction of the light from the semiconductor-type light source, and the driving mechanism is configured to move and switch the shade portion in a straight line between the first location and the second location.

5. The vehicle headlamp according to claim 1, wherein the reflector is mounted by means of a mount bracket which is perpendicular to the reflector in a vehicle vertical direction, and the shade is configured to be slidably removable in an approximately parallel direction to the semiconductor-type light source, between the first location and the second location perpendicular to the mount bracket.

6. The vehicle headlamp according to claim 1, wherein the first reflection surface and the second reflection surface each comprise a parabola-based free curved surface, the first reflection surface and the second reflection surface provided on a single interior face of a closed portion of the reflector.

* * * * *